United States Patent [19]

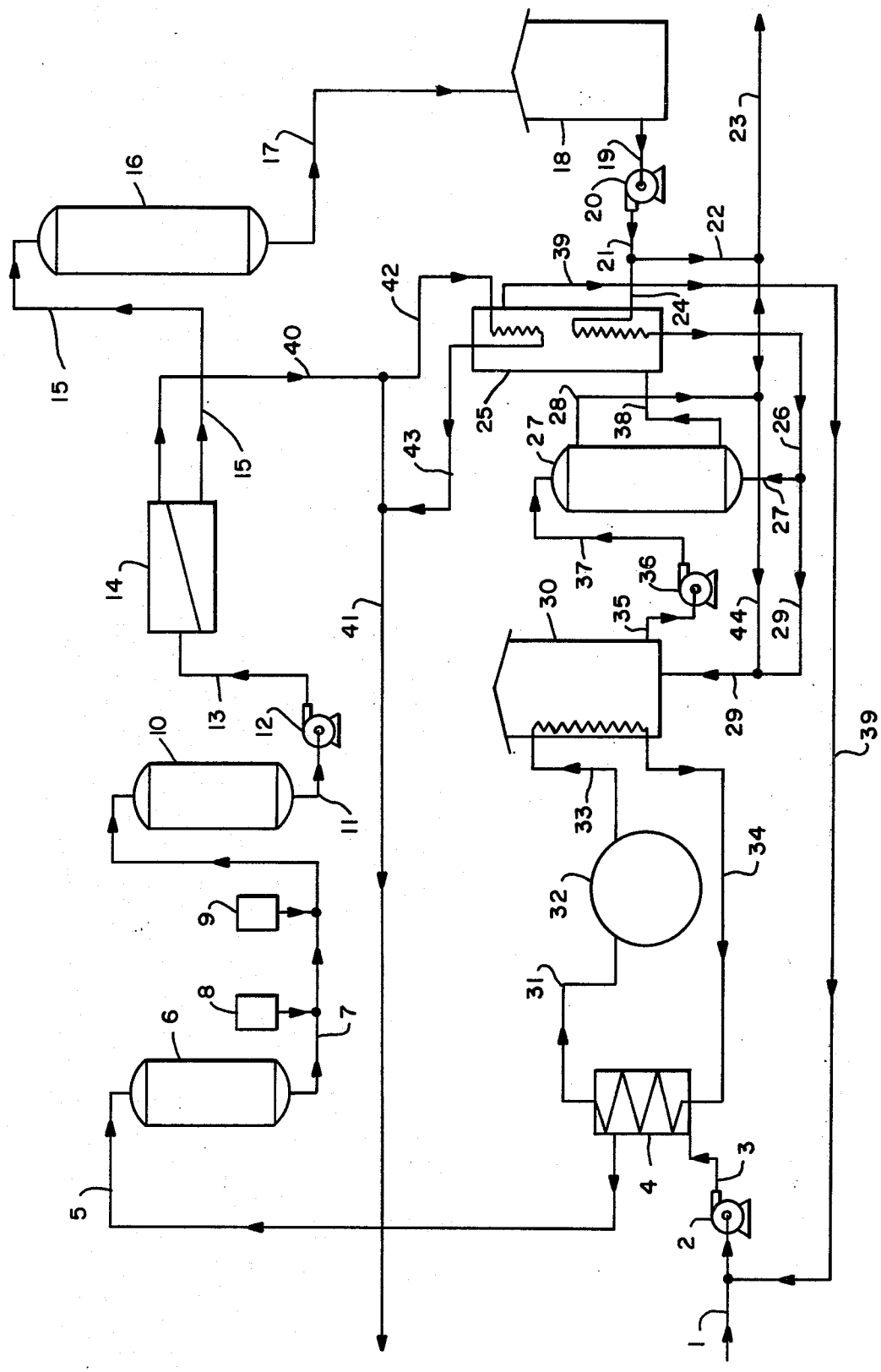

Coillet

[11] 4,161,445
[45] Jul. 17, 1979

[54] PROCESS FOR THE DESALINATION OF SALT CONTAINING WATER

[76] Inventor: Dudley W. Coillet, 12 Ross Rd., Belmont, Mass. 02178

[21] Appl. No.: 854,405

[22] Filed: Nov. 23, 1977

[51] Int. Cl.² .............................................. B01D 13/00
[52] U.S. Cl. ................... 210/23 H; 210/32; 210/34; 210/181; 210/186; 210/182
[58] Field of Search ..................... 210/21–23, 210/24, 26, 27, 30 R, 32, 34, 181, 182, 186, 195 R, 321

[56] References Cited

U.S. PATENT DOCUMENTS 3,526,320 9/1970 Kryzer .................................. 210/321

FOREIGN PATENT DOCUMENTS

| 59441 | 11/1967 | Australia ................................ 210/32 |
| 55558 | 11/1974 | Australia ................................ 210/32 |
| 2627366 | 12/1977 | Fed. Rep. of Germany ........ 210/23 H |

Primary Examiner—Ferris H. Lander
Attorney, Agent, or Firm—Flehr, Hohbach, Test, Albritton & Herbert

[57] ABSTRACT

Water which contains contaminants such as brine may be subjected to a desalination process and made potable thereby by treating the water in a reverse osmosis and ion exchange system, the heat which is present in the water source being utilized to thermally regenerate the ion exchange resin.

3 Claims, 1 Drawing Figure

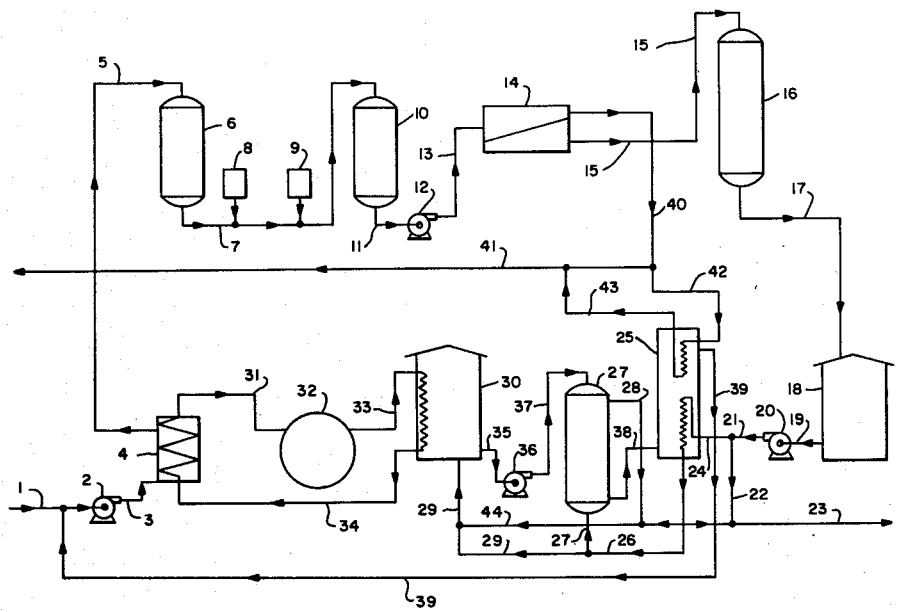

PROCESS FOR THE DESALINATION OF SALT CONTAINING WATER

Water such as sea water which possesses a salinity thus rendering the water unfit for drinking also possesses a relatively high temperature in certain regions due to the collection of solar heat therein. The high temperature and high salinity sea water must therefore be treated to render the same potable. However, the high temperature of the sea water in certain areas of the world, such as the mid-east, limits the life of some membranes which are used in a reverse osmosis process which is used to treat the water. In some instances the sea water is rendered potable by subjecting said sea water to two reverse osmosis treatments. However, in contrast to this, substitution of an ion exchange step for the second stage reverse osmosis will provide a practical alternative for the desalting operation. However, passage of the water through a bed of ion exchange resin may be accomplished only for a particular or predetermined period of time, after which the feed must be discontinued and the ion exchange resin must be regenerated. One method of regenerating certain ion exchange resins hereinafter described is by utilizing a thermal process in which the regenerant is heated and passed through the bed of ion exchange resin to remove the salts which have accumulated therein and render the ion exchange resin active for further treatment of the desired product water.

It has now been discovered that the problems which are inherent in treating a water source which is at a relatively high temperature by means of a reverse osmosis process may be overcome in a manner hereinafter set forth in greater detail.

It is therefore an object of this invention to provide a process for obtaining potable water from a water source which contains contaminants therein.

A further object of this invention is to provide a process for treating sea water which is recovered at a relatively high temperature in a manner whereby said sea water is rendered potable.

In one aspect an embodiment of this invention resides in a process for the obtention of potable water involving the conjunctive use of reverse osmosis and ion exchange systems to treat a water source containing contaminants therein by passing said water source through a reverse osmosis membrane and thereafter passing the permeate through a bed of ion exchange resin to remove said contaminants, the improvement which comprises utilizing the heat which is present in said water source to thermally regenerate said ion exchange resin.

A specific embodiment of this invention is found in a process for the obtention of potable water in which a water source such as sea water containing solar heat is passed through a reverse osmosis membrane and the permeate therefrom is passed through a bed of ion exchange resin to remove the contaminants and render the water potable, the solar heat present in said sea water being removed from the water prior to passage of the water through a reverse osmosis membrane and utilized to thermally regenerate the ion exchange resin.

Other objects and embodiments will be found in the following detailed description of the present invention.

As hereinbefore set forth the present invention is concerned with a process for the desalination of water containing salt. The desalination of salt water is accomplished by subjecting the water source to a process which involves the conjunctive use of a reverse osmosis system and an ion exchange system to remove the contaminants in said water. The inventive feature of this process lies in the use of the heat which is normally present in the water source to thermally regenerate the ion exchange resin when the resin becomes contaminated and is thus rendered ineffective to remove unwanted elements or compounds present in the water. The process for the desalination of a saline water source is effected by charging a water source such as sea water which is at an elevated temperature due to the solar heat contained therein to a cooler wherein the heat contained in the sea water is removed and utilized in a manner hereinafter set forth in greater detail. Following this the cooled water source which is now at a temperature reading equivalent to atmospheric wet-bulb temperature, whatever that may be for the climatic circumstances, is passed through a multi-media filter and has added thereto a sufficient amount of acid and inhibitor to maintain the pH of the sea water in the acid range, preferably from about 5 to about 6.5. After passage through the filters to remove unwanted solids, the treated water source is then charged to a reverse osmosis system. The treatment of the sea water in the reverse osmosis system is effected at a pressure in the range of from about 650 psi to about 1000 psi and at a temperature in the range of from about 15° C. to about 45° C. The removal of the solar heat which is present in the water source with a subsequent cooling to a temperature of about atmospheric wet-bulb temperature is necessary inasmuch as many of the membranes which are used in a reverse osmosis system are affected adversely by high temperature. The reverse osmosis membranes which are utilized in the system may comprise any of those which are known in the art including membranes made from cellulose triacetate, cellulose diacetate, polyethyleneimines which have been reacted with a polyfunctional reagent, epiamines which have been reacted with a polyfunctional reagent, said membranes being deposited on a porous support material such as polysulfones, polyvinylchlorides, etc. It is to be understood that these examples of semi-permeable membranes and porous supports are only representative of the types of membranes which may be used in the reverse osmosis system, and that the present invention is not necessarily limited thereto. After passage through the reverse osmosis system the permeate is recovered and subjected to a vacuum degassing operation which is effected at a pressure of about 100 mm whereby carbon dioxide and dissolved oxygen is removed therefrom. The degassed permeate will still contain a substantial amount of dissolved solids which must also be removed before the water is suitable for drinking. The removal of these solids is effected by subjecting the permeate to filtration by means of an ion exchange resin. Therefore, the permeate is passed through a bed of the ion exchange resin at a predetermined flow rate for example in the range of from about 10 gal/hr. to about 10 million gal/hr. until the ion exchange resin becomes contaminated and is ineffective as an agent for the removal of the solids. The ion exchange resin which may be utilized may comprise resins such as styrene-divinylbenzene copolymeric matrix systems which contain a surface area of from about 1 to about 500 m$^2$/g. These resins are sold under various tradenames such as Rohm & Haas XD-2, Diamond Sirotherm TR-20 and TR-10, Dowex 11, Dowex 1-X8, Dowex 2X-8, etc. As in the case of the semi-permeable membranes, it is to be understood that any type of ion exchange resin may be employed and that the present invention is not necessarily limited to those hereinafter enumerated. After passage through the ion exchange resin the product water is recovered and removed to storage. However, when or before the efficiency of the ion exchange resin diminishes to a point where it no longer removes the undesired ions it must periodically be regenerated in order to regain its effectiveness.

The regeneration of the ion exchange resin is accomplished by treating said resin with a regenerant at an elevated temperature. The regenerant which is employed will consist of a portion of the permeate from the reverse osmosis system as well as a portion of the water source which is passed through the ion exchange resin but still retains a high degree of salinity. The regenerant is passed into a thermal storage tank wherein it is heated to a temperature in the range of from about 60° to about 98° C. by means of a vaporous refrigerant such as Freon which has been heated by passage through the cooler which has extracted the heat from the water source. The regenerant which is at an elevated temperature of about 60° C. to 95° C. passes through the ion exchange resin in a downflow, thereafter the hot brine resulting from the regeneration exchanges heat with the degassed permeate which is pumped to the bottom of the thermal storage unit thus displacing hot regenerant, and thereafter with the sea water waste from the reverse osmosis unit. After regenerating the ion exchange resin and cooling by passage through a heat exchanger the regenerant is then recycled to admix with the raw feed and enters back into the system.

Therefore, by utilizing a particular flow of the present invention, it is possible to cool the water source by removing the solar heat contained therein, thus permitting the water source to be charged to a reverse osmosis system without subjecting the integrity of the semipermeable membranes to injurious forces which would lessen the ability of the membranes to remove unwanted contaminants from said water source.

BRIEF DESCRIPTION OF THE DRAWING

The present invention will be further illustrated with reference to the accompanying drawing which sets forth a flow diagram of the process of the invention. It is to be understood that various valves, pumps, etc., have been eliminated as not being essential to the complete understanding of the invention. However, the utilization of these, as well as other similar appurtenances, will become obvious as the drawing is described.

Referring now to the drawing, a feed source of water which contains a high degree of salinity such as sea water and which also is at a relatively high temperature is charged through line 1 to pump 2. Thereafter the raw sea water passes through line 3 into heat transfer means 4 wherein the undesired heat from the water source is removed by contact with a refrigerant such as Freon. After cooling in heat transfer means 4 the cooled water is withdrawn through line 5 and passed into a multimedia filter 6. The filter will remove a portion of the finely dispersed solids which are present in the raw sea water charge. After passage through filter 6 the water is withdrawn through line 7 and subjected to treatment with an inhibitor from vessel 8 and an acid such as hydrochloric acid from vessel 9 to maintain the proper pH. After treatment with the aforesaid inhibitor and acid the water is charged to a cartridge filter 10 wherein more of the finely dispersed solids which would be detrimental to the reverse osmosis treatment are removed. The charge is then withdrawn from filter 10 through line 11 and after passing through pump 12 is charged through line 13 into a reverse osmosis system 14. In reverse osmosis system 14 the major portion of the compounds which afford the high salinity of the water are removed. The permeate from the reverse osmosis system is withdrawn through line 15 and subjected to a vacuum degassing operation in degasser 16 for removal of the carbon dioxide and dissolved oxygen. After degassing the permeate is withdrawn through line 17 and passed to a permeate storage vessel 18. From permeate storage vessel 18 the permeate is withdrawn through line 19 to pump 20. From pump 20 a portion of the permeate, in sufficient quantity so that the salinity of the potable blend comprising several streams hereinafter defined reaches up to a salinity specification in the potable range which is agreed to beforehand as between producer and consumer representatives, is withdrawn through line 21 and passes through line 22 to line 23 for storage. Except for such portion, the permeate is passed through line 24 to heat exchanger 25. After passage through heat exchanger 25 the permeate is withdrawn through line 26 and passed through line 27' into an ion exchange system 27. After passage through the ion exchange resin wherein salinity and/or total dissolved solids are reduced to the desired value the treated water is withdrawn through line 28 into line 23 and thereafter passed to storage. Alternatively, a portion of the permeate from the reverse osmosis system may be withdrawn through line 26 and passed through lines 44 and 29 into thermal storage vessel 30 for use, after heating, as part of the regenerant for the ion exchange resin. The regenerant is heated in thermal storage vessel 30 by means of a refrigerant such as Freon which has been heated in heat transfer means 4 by the solar heat which is contained in the sea water feed. The vaporous refrigerant is withdrawn from heat transfer 4 through line 31 to a compressor 32. After compression in the compressor the compressed refrigerant is withdrawn through line 33 to thermal storage vessel 30 wherein the heat is transmitted with the regenerant contained therein. The liquid refrigerant is then withdrawn through line 34 from thermal storage vessel 30 and recycled to heat transfer means 4 for further use therein. The heated regenerant is withdrawn from thermal storage vessel 30 through line 35 to pump 36 and from pump 36 through line 37 to the ion exchange vessel 27. The regeneration of the ion exchange resin is operated in a downflow manner to wash out and regenerate the resin. The regenerant is withdrawn from ion exchange vessel 27 through line 38 and passed to heat exchanger 25. After removal of the heat in heat exchanger 25 the regenerant is withdrawn therefrom through line 39 and recycled to form a portion of the charge to heat transfer means 4.

The concentrate brine from reverse osmosis system 14 is withdrawn therefrom through lines 40 and 41 and passed to a waste outlet. In addition, a portion of the concentrate brine may also be passed through line 42 into heat exchanger 25 and after absorption of the heat is withdrawn through lines 43 and 41 to a waste outlet.

The following example is given for purposes of illustrating the process of this invention. However, the example is given merely for purposes of illustration and is not intended to limit the broad scope of this invention is strict accordance therewith.

EXAMPLE I

A charge of sea water which possesses a temperature of about 78° F. (25.6° C.) may be charged to a heat transfer apparatus wherein it will be contacted with Freon. After passage through the heat transfer apparatus the solar heat present in the sea water will be extracted from the water and the water may then be discharged from the apparatus at a temperature of about 70° F. The cooled sea water may then be passed through a multi-media filter wherein a portion of the finely dissolved solids which are present in the sea water are removed. After discharge from the multi-media filter the sea water may then be injected with an inhibitor such as sodium hexametaphosphate, and with hydrochloric acid whereby the pH of the sea water is reduced to a range between 5 and 6.5. The acidified sea water may then be passed through another filter to remove an additional amount of finely divided solids and passed through a reverse osmosis system. In the reverse osmosis system the sea water may be passed through a semi-permeable membrane system such as one comprising polyethyleneimine supported on a polysulfone film. The passage through the semi-permeable membrane(s) may be effected at a pressure of about 800 psig while maintaining the temperature of the charge at about 72° C., the flow rate of the sea water through the membrane(s) being at a rate of about 30 gal/hr. to 50 million gal/hr. The permeate from the reverse osmosis system may be withdrawn and passed through a vacuum degassing apparatus whereby the carbon dioxide which is present in the sea water is removed, said degassing being effected at a pressure of about 100 mm. The degassed permeate may then be charged to a permeate storage vessel and withdrawn from this vessel to pass through a heat exchanger and from the heat exchanger through an ion exchange vessel. The ion exchange vessel may contain an ion exchange resin such as that sold under the tradename Rohm & Haas XD-2. After passage through the ion exchange resin the filtrate may then be withdrawn and passed to storage for use after blending with alkali, such as caustic soda, and optionally with some degassed permeate as a potable liquid.

After treatment of the water with the ion exchange resin for a prolonged period of time the resin may loose its efficiency and must be subjected to regeneration. The regeneration of this resin is effected by passing water from the permeate storage vessel to a thermal storage vessel wherein it is heated to a temperature of 60° C. to 98° C., by condensing the refrigerant vapors which contain the heat withdrawn from the raw sea water charge. After heating the regenerant to the aforesaid temperature it may then be withdrawn from the thermal storage vessel and passed through the ion exchange resin bed, for example in downflow. After passage through the ion exchange resin bed which will regenerate said bed the regererant may be withdrawn from the bottom of said bed, passed through a heat exchange vessel to reduce the temperature of the regenerant to about 40° C. and thereafter recycled to form a portion of the charge to the heat transfer means.

I claim as my invention:

1. A process for forming potable water from a salt-containing water source comprising the steps of
    (a) passing water from said water source in a stream through a heat exchange zone, wherein it is cooled,
    (b) passing said cooled water stream through a reverse osmosis membrane zone to form a permeate water stream,
    (c) passing said permeate stream through a thermal ion exchange desalination resin bed to form a potable water stream,
    (d) preheating a regenerant water stream by heat generated during cooling of said water source stream in said heat exchange zone, and
    (e) periodically thermally regenerating said desalination resin by passing said preheated regenerated stream through said resin bed.

2. The method of claim 1 in which said water source is sea water.

3. The method of claim 1 in which said regenerant water stream from said resin bed is recycled and merges with the water source stream prior to passing through the heat exchange zone.

* * * * *